US010558008B2

(12) United States Patent
Kageyama

(10) Patent No.: US 10,558,008 B2
(45) Date of Patent: Feb. 11, 2020

(54) LENS UNIT

(71) Applicant: Nittoh Inc., Suwa-shi, Nagano (JP)

(72) Inventor: Takuya Kageyama, Nagano (JP)

(73) Assignee: Nittoh Inc. (JP)

( * ) Notice: Subject to any disclaimer, the term of this patent is extended or adjusted under 35 U.S.C. 154(b) by 449 days.

(21) Appl. No.: 15/353,382

(22) Filed: Nov. 16, 2016

(65) Prior Publication Data

US 2017/0059806 A1 Mar. 2, 2017

Related U.S. Application Data

(63) Continuation of application No. PCT/JP2015/061413, filed on Apr. 14, 2015.

(30) Foreign Application Priority Data

May 22, 2014 (JP) .................................. 2014-105992

(51) Int. Cl.
*G02B 7/02* (2006.01)
(52) U.S. Cl.
CPC ...................................... *G02B 7/02* (2013.01)
(58) Field of Classification Search
CPC ............. H04N 5/2254; H04N 5/23296; H04N 5/23216; H04N 5/2353; H04N 13/128;
(Continued)

(56) References Cited

U.S. PATENT DOCUMENTS 2,172,340 A * 9/1939 Mihalyi ................. G03B 17/04
116/323
2,926,579 A * 3/1960 Gebele ................... G03B 17/02
396/144
(Continued)

FOREIGN PATENT DOCUMENTS

EP 1804099 A2 7/2007
JP S51-161126 U 12/1976
(Continued)

OTHER PUBLICATIONS

International Search Report (in Japanese) regarding corresponding Application No. PCT/JP2015/061413 dated Jul. 14, 2015 (10 pages).

*Primary Examiner* — Alicia M Harrington
(74) *Attorney, Agent, or Firm* — Harness, Dickey & Pierce, P.L.C.

(57) ABSTRACT

A lens unit includes a display member that is in a cylindrical shape, that rotates around an optical axis of the lens unit, and that has a scale indicating a photographing distance on an outer circumference surface thereof, and a window member that is provided over the display member, that exposes part of the outer circumference surface including the scale of the display member, and that hides the other part of the outer circumference surface of the display member. The photographing distance has first and second length units. The display member is movable along the optical axis between a first position and a second position. When the display member is in the first positon, the window member exposes the first length unit. Further, when the display member is in the second position, the window member exposes the second length unit.

4 Claims, 4 Drawing Sheets

(58) Field of Classification Search
CPC ........... H04N 5/232939; H04N 5/2257; H04N
5/2252; H04N 2213/001; H04N 13/246;
G02B 7/04; G02B 7/023; G02B 13/04;
G02B 7/14; G02B 7/09; G02B 13/009;
G02B 7/00; G02B 27/0172; G02B
27/0176; G02B 7/022; G03B 17/14;
G03B 3/10; G03B 5/00; G03B 13/36;
G03B 17/08; G03B 17/20; G06T
2207/10148; G06K 7/10752; H01L
2924/00012
See application file for complete search history.

(56) References Cited

U.S. PATENT DOCUMENTS

| | | | | |
|---|---|---|---|---|
| 4,148,562 | A | * 4/1979 | Sawano | G02B 7/04 |
| | | | | 359/825 |
| 5,278,601 | A | 1/1994 | Kawanami | |
| 2007/0147818 | A1 | 6/2007 | Mori | |
| 2013/0271862 | A1 | 10/2013 | Takano | |

FOREIGN PATENT DOCUMENTS

| | | |
|---|---|---|
| JP | S58-123426 U | 8/1983 |
| JP | H06-27363 A | 2/1994 |
| JP | H07-92534 A | 4/1995 |
| JP | 2003-005008 A | 1/2003 |
| JP | 2007-178633 A | 7/2007 |
| JP | 2009-042668 A | 2/2009 |
| JP | 2013-003446 A | 1/2013 |
| JP | 2013-222000 A | 10/2013 |
| JP | 2015-014638 A | 1/2015 |

\* cited by examiner

LENS UNIT

CROSS-REFERENCE TO RELATED APPLICATION

This application is a continuation of PCT Application No. PCT/JP2015/061413 filed Apr. 14, 2015 which claims priority to Japanese Patent Application No. 2014-105992 filed May 22, 2014 which are hereby expressly incorporated by reference herein in their entireties.

BACKGROUND

The present invention relates to a lens unit.

A technology relating to a display member of a camera that has a scale indicating a photographing distance is disclosed in, for instance, Japanese Patent Publication No. H07-092543. Further, a lens unit for such as a movie or a television broadcasting has a scale indicating a photographing distance in units of the metric system and the U.S. customary system (such as for measuring length, meters and feet).

In regards to a lens unit for such as a movie or a television broadcasting, it is preferred for many users that a display member shows a scale in a unit that the users are familiar with. Therefore, in order to change the unit of the scale, it is necessary that the lens unit is sent to a support center of a manufacturer of the lens unit. Thereafter, the lens unit is discomposed (disassembled) and a scale unit display component is replaced with another scale unit display component by the support center. The replacement explained above is very complicated.

SUMMARY

Therefore, the present invention attempts to solve the problems explained above to avoid the complication. An object of the present invention is to provide a lens unit that can easily change a scale unit of a photographing distance.

To achieve the above object, a lens unit according to one aspect of the present invention includes: a display member that is in a cylindrical shape or a partial cylindrical shape, that rotates around an optical axis of the lens unit, and that has a scale indicating a photographing distance on an outer circumference surface of the display member; and a window member that is provided over the display member, that exposes part of the outer circumference surface including the scale of the display member, and that hides the other part of the outer circumference surface of the display member. The photographing distance has a first length unit and a second length unit that is different from the first length unit. The display member is movable along the optical axis between a first position and a second position. When the display member is in the first positon, the window member exposes the first length unit. Further, when the display member is in the second position, the window member exposes the second length unit.

In the lens unit according to the above aspect of the present invention, the first length unit is the metric system, and the second length unit is the U.S. customary system.

In the lens unit according to the above aspect of the present invention, the lens unit further includes a fixing member that has a first state and a second state. When the fixing member is in the first state, the fixing member fixes the display member so as to prevent the display member from moving. Further, when the fixing member is in the second state, the fixing member release the display member so that the display member is movable between the first position and the second position.

In the lens unit according to the above aspect of the present invention, the lens unit further includes: a guide member that is provided to overlap with the display member in a radial direction of the display member and that rotate around the optical axis as the display member rotates; a projection that is provided at one of the display member and the guide member; and a fitting member that is provided at the other of the display member and the guide member and that fixes a relative position of the display member and the guide member when the projection is aligned with the fitting member.

In the lens unit according to the above aspect of the present invention, the fitting member is in a longitudinal shape extending in a rotation direction of the display member so that a relative position between the display member and guide member is changeable in the rotation direction while the projection is aligned with the fitting member.

In the lens unit according to the above aspect of the present invention, the fitting member is in a longitudinal shape extending along the optical axis so that the display member is movable between the first position and the second position while the projection is aligned with the fitting member.

In the lens unit according to the above aspect of the present invention, the fitting member is a through hole through which the projection is inserted.

The present invention can provide a lens unit that can easily change a scale unit of a photographing distance.

DESCRIPTION OF EXEMPLARY EMBODIMENTS

Figure 1:
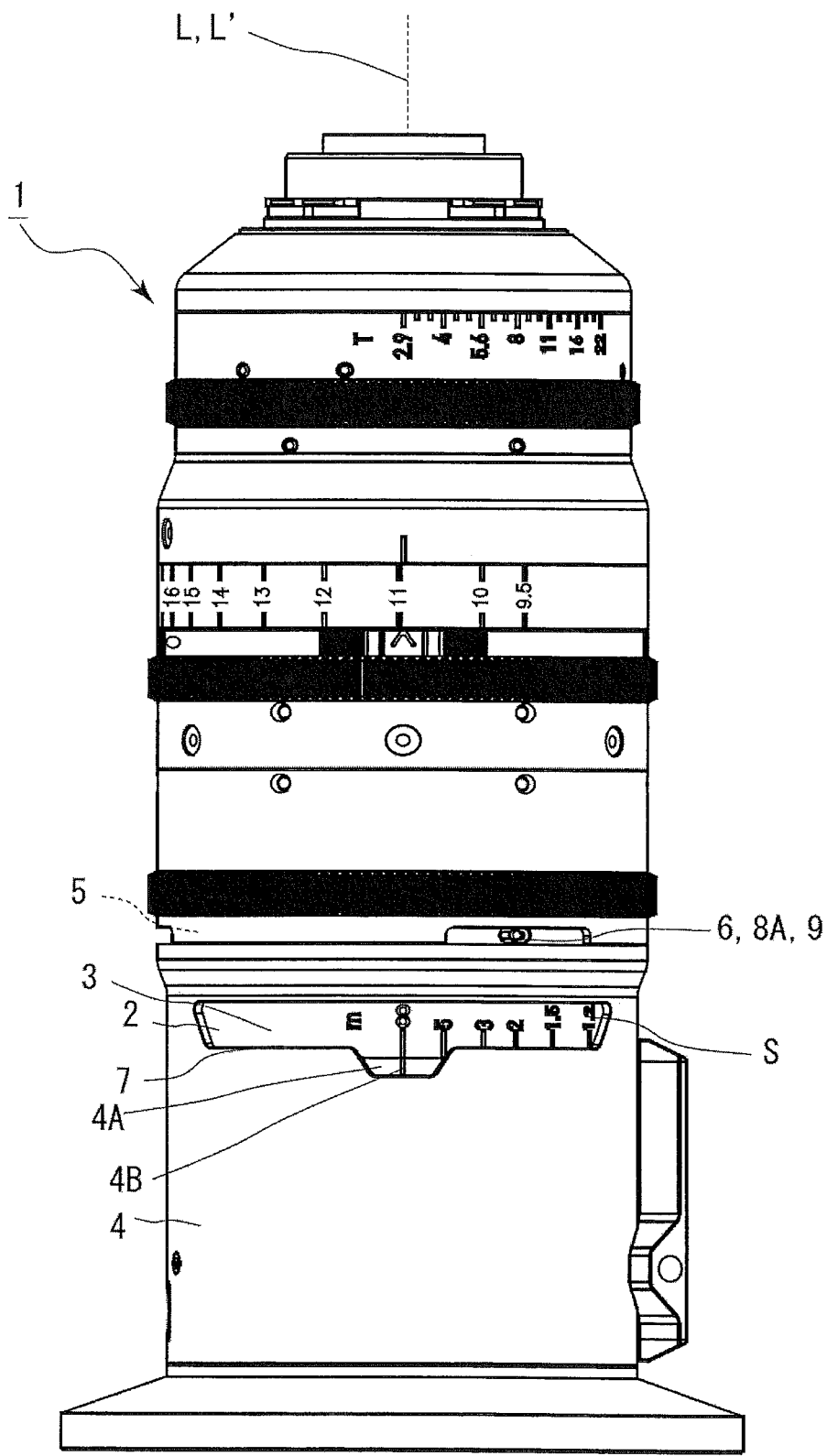
FIG. 1 is a front view that shows a lens unit according to an embodiment of the present invention.

A Configuration and an Operation of a Lens Unit According to an Embodiment of the Present Invention As discussed below, a lens unit according to an embodiment of the present invention will be explained with reference to the drawings. FIG. 1 is a front view that shows a lens unit according to the embodiment of the present invention.

In regards to a lens unit 1, a photographing distance is shown by using a scale S. The scale S is provided (displayed) on an outer circumference surface 3 of a display member 2. Specifically, an optical axis L of the lens unit 1 is defined as a center line L'. The display member 2 is in a cylindrical (tubular) shape and rotates around the center line L' as a rotational axis. Further, the lens unit 1 has a window member 4 that exposes a part of the outer circumference surface 3 of the display member 2 and that hides the other parts of the outer circumference surface 3. Further, the display member 2 can change its position (can move) in a direction (a vertical direction or an up down direction shown in FIG. 1) parallel to the center line L' while the center line L' is not substantially changed. According to the above position change, the scale S that is exposed from the window member 4 can also be changed to show a different distance unit.

A photographing distance adjustment mechanism member 5 (a fixing member) shown in FIG. 1 can rotate around the optical axis L (the center line L') as the rotational axis. Further, when the photographing distance adjustment mechanism member 5 rotates, the photographing distance of the lens unit 1 is changed. The photographing distance adjustment mechanism member 5 and the display member 2 are fixed at four points where the outer circumference surface 3 is sectioned in a circumferential direction (a direction along an outermost peripheral of a sectional shape that is obtained by cutting the display member 2 by a plane perpendicular to the center line L'; this definition is applied to the specification below) by a fixing screw 6 (a fixing vis) at 90° intervals from the center line L'. Therefore, the display member 2 rotates around the center line L' as the rotational axis according to the rotation of the photographing distance adjustment mechanism member 5 and the photographing distance change of the lens unit 1.

Further, the window member 4 is not fixed with the display member 2 and the photographing distance adjustment mechanism member 5. In other words, the window member 4 does not rotate when the display member 2 and the photographing distance adjustment mechanism member 5 rotate. Further, a window 7, which is an opening of the window member 4, can expose a part of the scale S (the scale of units of length of the metric system (meters)) of the display member 2. Therefore, according to the rotation of the photographing distance adjustment mechanism member 5 caused by the change of the photographing distance of the lens unit 1, an exposed state of the scale S of the display member 2 that is exposed from the window 7 of the window member 4 changes. The change of the exposed state of the scale S corresponds to the change of the photographing distance of the lens unit 1. The photographing distance of the lens unit 1, which is adjusted by the photographing distance adjustment mechanism member 5, is continuously shown at a position on the scale S that is exposed from the window 7 of the window member 4 according to an adjustment state. Specifically, the position on the scale S is indicated by an index line 4B provided at a thin part 4A that is obtained by making a part of the window member 4 thin. This index line 4B is fixed and is not changed its position when the display member 2 rotates. Further, it is not limited that the index line 4B is provided at the thin part 4A. That is, it is also possible, for instance, that the same role as the index line 4B is obtained by attaching a plate member (on which an index line is marked) to the window member 4. Specifically, the plate member is prepared separately from the window member 4. Further, the index line 4B does not always need to be provided at the lens unit 1.

Figure 2:
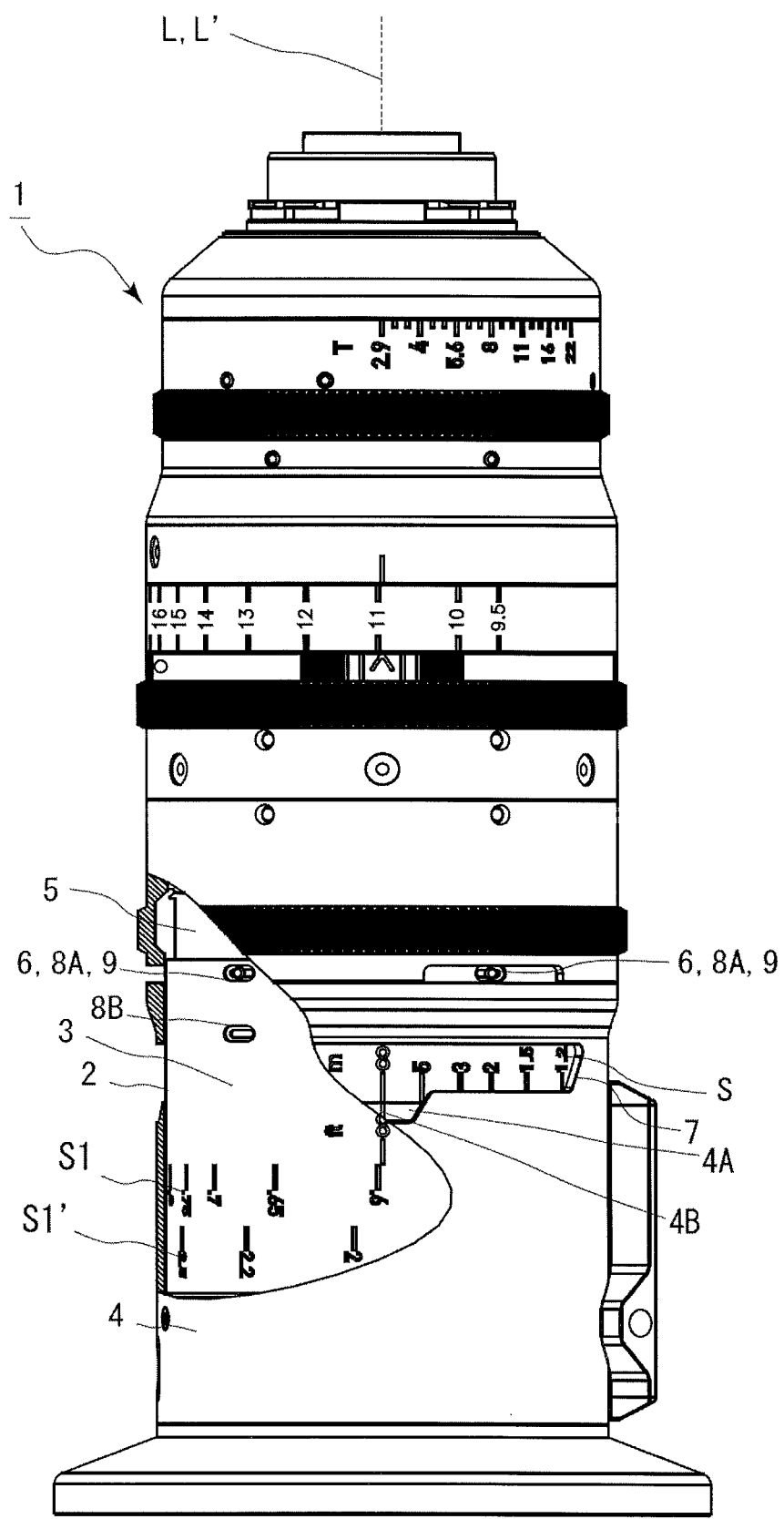
FIG. 2 is a diagram that shows a hidden part of a display member by partially cutting off a window member and a photographing distance adjustment mechanism member of the lens unit shown in FIG. 1 according to the embodiment of the present invention.

FIG. 2 is a diagram that shows a hidden part of the display member 2 by partially cutting off the window member 4 and the photographing distance adjustment mechanism member 5 of the lens unit 1 shown in FIG. 1 according to the embodiment of the present invention. Further, FIG. 3 is a front view that shows the display member 2 of the lens unit 1 shown in FIGS. 1 and 2 according to the embodiment of the present invention.

A metric unit screw fixing hole 8A and a feet unit screw fixing hole 8B are formed in the display member 2. Further, a screw fixing hole 9 is formed in the photographing distance adjustment mechanism member 5. In FIGS. 1 and 2, the metric unit screw fixing hole 8A and the screw fixing hole 9 are fixed by fixing screws 6 as a fixing tool.

Figure 3:
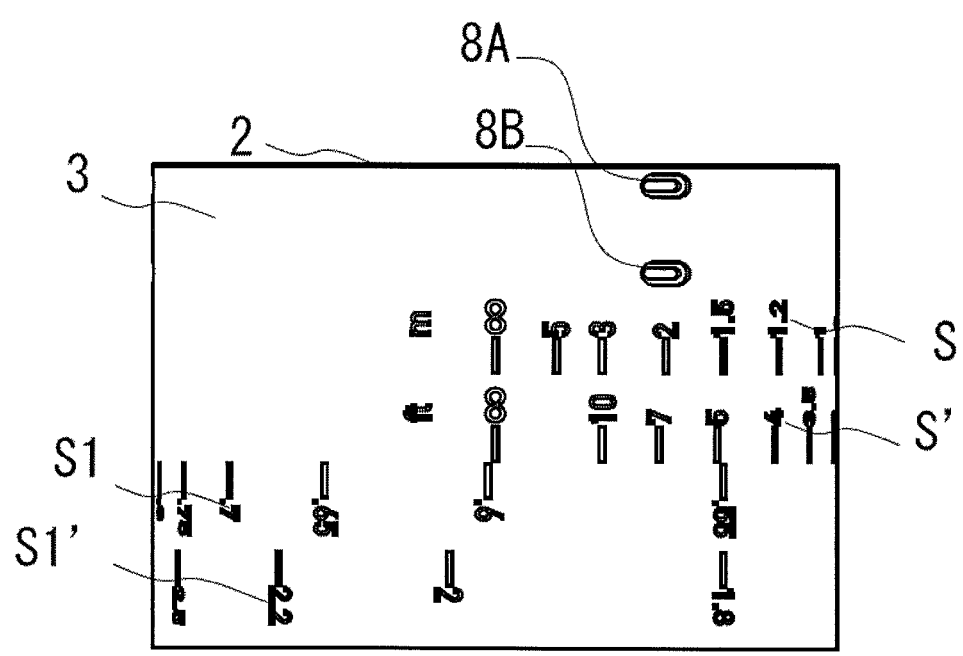
FIG. 3 is a front view that shows the display member having a scale for a photographing distance in units of the metric system (meters) and the U.S. customary system (feet) shown in FIGS. 1 and 2 according to the embodiment of the present invention.

Further, as shown in FIG. 3, the scale S for units of length in the metric system (meters) (referred to as "metric distance unit") and the scale S' for units of length in the U.S. customary system (feet) (referred to as "feet distance unit") are engraved in the display member 2. The character "m" being a symbol of "meter" is engraved on the scale S for the metric distance unit as a mark. The characters "ft" being a symbol of "feet" is engraved on the scale S' of the feet distance unit as a mark.

Figure 4:
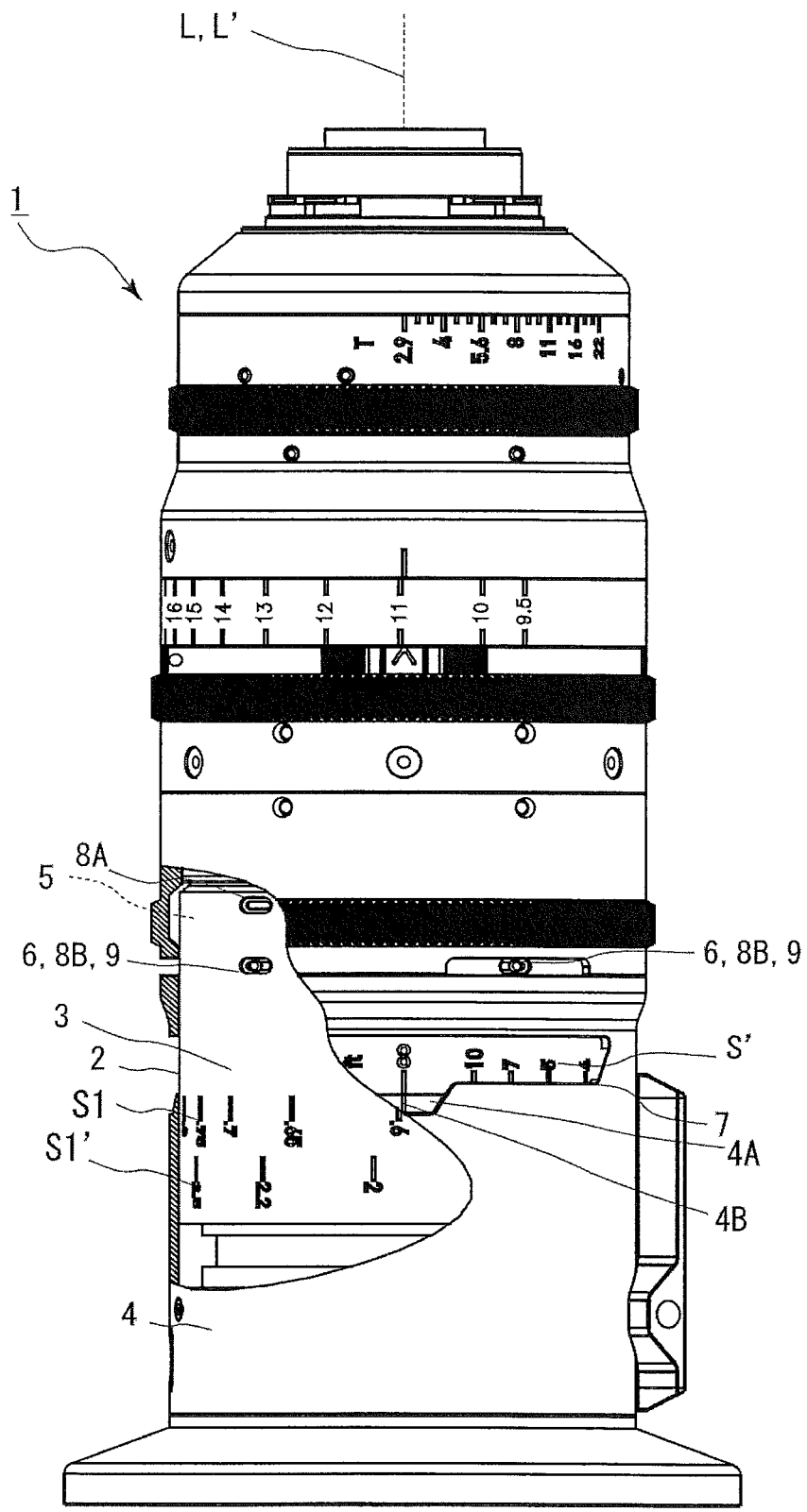
FIG. 4 is a diagram that shows a state in which a photographing distance of the lens unit is displayed by a scale unit of the U.S. customary system.

Further, the same window as the window 7 of the window member 4 is formed on a rear side of the lens unit 1 shown in FIG. 1. Further, a scale S1 of the same distance unit as the scale S shown in FIGS. 1 and 2, and a scale S1' of the same distance unit as the scale S' shown in FIG. 4 are exposed and displayed via the window. The scales S1 and S1' are shown in FIGS. 2, 3 and 4.

Next, in a state of the lens unit 1 shown in FIG. 2, an operation for changing the photographing distance of the lens unit 1 from the current scale S of the metric distance unit to the scale S' of the feet distance unit shown through the window 7 of the window member 4 will be explained. First of all, the fixing screws 6 that fix the metric unit screw fixing hole 8A and the screw fixing hole 9 are unscrewed. Thereafter, the display member 2 is slid and moved toward an upper side in FIG. 2. Lastly, the feet unit screw fixing hole 8B and the screw fixing hole 9 are fixed (screwed) by the fixing screws 6. The above operation for changing the photographing distance of the lens unit 1 is completed with such simple processes explained above. FIG. 4 is a diagram that shows a state after the above operation is completed and that shows the state in which the photographing distance of the lens unit 1 is displayed by the scale S' of the foot distance unit. FIG. 4 also shows a hidden part of the display member 2 by partially cutting off the window member 4 and the photographing distance adjustment mechanism member 5 of the lens unit 1 shown in FIG. 1 in the same manner as FIG. 2 and shows that the fixed position of the display member 2 shown in FIG. 1 is changed.

Further, the metric unit screw fixing hole 8A and the feet unit screw fixing hole 8B are longitudinal holes that extend in the circumferential direction of the display member 2. Therefore, in a state in which the metric unit screw fixing hole 8A or the feet unit screw fixing hole 8B, and the screw fixing hole 9 are not fixed by the fixing screws 6, a position of the display member 2 can be adjusted in a range of an extending length of the longitudinal holes by sliding the display member 2 in the circumferential direction.

Main Effects that are Obtained by the Embodiment of the Present Invention

As explained above, the lens unit 1 according to the embodiment of the present invention can easily change the scale units of the photographing distance. In particular, a lens unit for a movie or a television may be used by both Americans and the Japanese. In that case, it is easier to understand for Japanese when the scale of the photographing distance is displayed in the metric distance unit, and it is easier to understand for Americans when the scale of the photographing distance is displayed in the feet distance unit. In such the case, it is possible to eliminate a time and efforts to replace the scale by a support center, and to manufacture and store the display members that display two kinds of the scale units by using the lens unit 1 according to the embodiment of the present invention.

Further, in the above state in which the screw fixing holes 8A, 8B and the screw fixing hole 9 are not fixed by the fixing screws 6, the position of the display member 2 can be adjusted in the range of the extending length of the longitudinal holes by sliding the display member 2 in the circumferential direction. Therefore, it becomes possible that a deviation between a position of the scales S and S' that are indicated by the index line 4B (the photographing distance shown by the lens unit 1) and an actual photographing distance can be corrected. Specifically, the deviation can be generated when a camera body that is attached to the lens unit 1 is changed.

Other Embodiment

The lens unit 1 according to the embodiment of the present invention explained above is an example of the ideal embodiment of the present invention. Therefore, it will be apparent that the same may be varied in many ways. Such variations are not to be regarded as a departure from the spirit and scope of the invention, and all such modifications as would be apparent to one of ordinary skill in the art are intended to be included within the scope of the following claims.

For instance, the distance unit of the scales S and S' of the display member 2 can be the other distance units such as yards, miles or inches, not meters or feet. Further, the display member 2 displays two kinds of the distance units and selects one of the two distance units. However, it is possible that the scale of the display member 2 displays three or more kinds of the distance units and selects one distance unit among them.

Further, the display member 2 is in the cylindrical (tubular) shape. However, another configuration in which a predetermined area of a cylindrical shape is cut off in a circumferential direction can also be adopted.

Further, the same window as the window 7 of the window member 4 is also formed on a rear side of the lens unit 1 opposite to a front side of the front view of the lens unit 1 shown in FIG. 1. However, the number of windows that are formed in the window member 4 can be only one, or three or more.

The fixing member that fixes the display member 2 is the photographing distance adjustment mechanism member 5. But the present invention is not limited to use the photographing distance adjustment mechanism member 5 as a fixing member. A fixing member can also be, for instance, another (separate) member that is attached to the photographing distance adjustment mechanism member 5. Further, in the lens unit 1, the fixing screws 6 as the fixing tool fix the metric unit screw fixing hole 8A and the feet unit screw fixing hole 8B, and the screw fixing hole 9. However, each element or member, a screw hole and a screw, being used for this fixing configuration can be the other things. For instance, the fixing tool can also be a tool to press and fix the display member 2 and the fixing member by sandwiching them.

Further, in the above state in which the screw fixing holes 8A, 8B and the screw fixing hole 9 are not fixed by the fixing screws 6, the position of the display member 2 can be adjusted in the range of the extending length of the longitudinal holes by sliding the display member 2 in the circumferential direction. However, the configuration explained above does not need to be adopted. For instance, the screw fixing holes 8A and 8B can be perfectly circular holes, instead of the longitudinal holes.

Further, the photographing distance adjustment mechanism member 5 and the display member 2 are fixed at the four points where the outer circumference surface 3 is sectioned in the circumferential direction at 90° intervals from the center line L'. However, the fixed positions, the number of the fixed points, and the fixed position interval of the photographing distance adjustment mechanism member 5 and the display member 2 can be changed appropriately. For instance, the photographing distance adjustment mechanism member 5 and the display member 2 can also be fixed at two points where the outer circumference surface 3 is sectioned in the circumferential direction at 180° intervals from the center line L'.

Further, the lens unit 1 can have a guide member that rotates according to the rotation of the display member 2 and that is provided to overlap with the display member 2 in the radial direction of the display member 2. Further, it is also possible to have a convex protrusion (a projection) on one of the display member 2 and the guide member and to have a recessed part (a fitting member) into which the protrusion is inserted on the other of the display member 2 and the guide member. Then, it can also be adopted that the recessed part extends parallel to (along) the optical axis L (the center line L') so that the display member 2 is movable in an extending direction of the protrusion while the concave protrusion is inserted into the recessed part. By adopting the configuration explained above, when the display member 2 is slid and moved so as to change the distance unit being displayed, there are effects that the display member 2 is not significantly shifted in the circumferential direction.

In regards to the configuration having the protrusion and the recessed part explained above, a width dimension of the recessed part (a dimension in a direction orthogonal to the direction where the display member 2 is slid and moved) can be larger than the size of the protrusion that is inserted into the recessed part by a predetermined distance. For instance, when the predetermined distance is equal to the length of the longitudinal holes of the screw fixing holes 8A and 8B, the effects that the display member 2 is not significantly shifted in the circumferential direction at the time of sliding and moving the display member 2 can be obtained while the effects, which the position of the display member 2 can be adjusted in the range of an approximate extending length of the longitudinal holes by sliding the display member 2 in the circumferential direction, are maintained.

What is claimed is:
1. A lens unit comprising:
   a display member that is in a cylindrical shape or a partial cylindrical shape, that rotates around an optical axis of the lens unit, and that has a scale indicating a photographing distance on an outer circumference surface of the display member, the display member having first and second holes therein, the first and second holes being spaced apart from each other along the optical axis;
   a fixing base having a fixing part, the display member being fixed to the fixing base, the display member and the fixing base rotating around the optical axis at the same time when the display member is fixed to the fixing base;

a fixing projection selectively located in one of the first hole or the second hole to fix between the display member and the fixing base; and
a window member that is provided over the display member, that exposes part of the outer circumference surface including the scale of the display member, and that hides the other part of the outer circumference surface of the display member,
wherein the photographing distance has a first length unit and a second unit length that is different from the first length unit,
the display member is movable along the optical axis between a first position and a second position,
when the display member is in the first position and when the fixing projection is located at the first hole and the fixing part, the window member exposes the first length unit, and
when the display member is in the second position and when the fixing projection is located at the second hole and the fixing part, the window member exposes the second length unit.

2. The lens unit according to claim 1,
wherein the first length unit is the metric system, and the second length is the U.S. customary system (English system).

3. The lens unit according to claim 1,
wherein the fixing part of the fixing base is a third hole, and the fixing projection is a screw, and
when the third hole of the fixing base aligns with the first hole of the display member, the screw is inserted into the third hole and the first hole to fix between the display member and fixing base so as to expose the first length unit through the window member.

4. The lens unit according to claim 1,
wherein the fixing part of the fixing base is a third hole, and the fixing projection is a screw, and
when the third hole of the fixing base aligns with the second hole of the display member, the screw is inserted into the third hole and the first hole to fix between the display member and fixing base so as to expose the second length unit through the window member.

\* \* \* \* \*